(12) United States Patent
Renade

(10) Patent No.: US 8,386,841 B1
(45) Date of Patent: Feb. 26, 2013

(54) SYSTEMS AND METHODS FOR IMPROVING REDUNDANT STORAGE FAULT TOLERANCE

(75) Inventor: Dilip Renade, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 342 days.

(21) Appl. No.: 12/840,772

(22) Filed: Jul. 21, 2010

(51) Int. Cl.
*G06F 11/00* (2006.01)

(52) U.S. Cl. ............... 714/6.22; 714/6.23; 714/6.24; 714/6.3; 714/52

(58) Field of Classification Search .......... 714/4.1, 714/6.11, 6.2, 6.22, 6.23, 6.24, 6.3, 52
See application file for complete search history.

(56) References Cited

U.S. PATENT DOCUMENTS

| | | | | |
|---|---|---|---|---|
| 5,596,709 A * | 1/1997 | Bond et al. | | 714/6.32 |
| 7,529,834 B1 * | 5/2009 | Birrell et al. | | 709/226 |
| 8,086,937 B2 * | 12/2011 | Sim-Tang et al. | | 714/763 |
| 8,103,904 B2 * | 1/2012 | Hafner et al. | | 714/6.24 |
| 8,127,212 B2 * | 2/2012 | Wylie et al. | | 714/785 |
| 8,132,073 B1 * | 3/2012 | Bowers et al. | | 714/755 |
| 8,176,359 B2 * | 5/2012 | Ishikawa et al. | | 714/6.1 |
| 8,205,139 B1 * | 6/2012 | Sim-Tang et al. | | 714/769 |
| 8,225,040 B1 | 7/2012 | Patil et al. | | |
| 8,250,427 B2 * | 8/2012 | Wylie et al. | | 714/752 |
| 2004/0260967 A1 * | 12/2004 | Guha et al. | | 714/3 |
| 2005/0091450 A1 * | 4/2005 | Frolund et al. | | 711/114 |
| 2008/0016413 A1 * | 1/2008 | Hetzler et al. | | 714/52 |
| 2008/0222480 A1 * | 9/2008 | Huang et al. | | 714/752 |
| 2009/0044075 A1 * | 2/2009 | Read | | 714/764 |
| 2010/0064166 A1 * | 3/2010 | Dubnicki et al. | | 714/4 |
| 2010/0077252 A1 * | 3/2010 | Siewert et al. | | 714/6 |
| 2010/0138717 A1 * | 6/2010 | Wu et al. | | 714/752 |
| 2010/0199123 A1 * | 8/2010 | Cohen | | 714/4 |
| 2010/0218037 A1 * | 8/2010 | Swartz et al. | | 714/6 |
| 2010/0235677 A1 * | 9/2010 | Wylie et al. | | 714/5 |
| 2011/0029840 A1 * | 2/2011 | Ozzie et al. | | 714/763 |
| 2011/0113282 A1 * | 5/2011 | De Spiegeleer et al. | | 714/6.13 |
| 2012/0089865 A1 * | 4/2012 | Dhuse et al. | | 714/6.2 |
| 2012/0166867 A1 * | 6/2012 | Volvovski et al. | | 714/6.22 |
| 2012/0166868 A1 * | 6/2012 | Volvovski et al. | | 714/6.22 |

OTHER PUBLICATIONS

James Lee Hafner; Matrix Methods for Lost Data Reconstruction in Erasure Codes; USENIX Association; 4th USENIX Conference on File and Storage Technologies; 2005.
Jehan-Francois Paris; Self-Adaptive Disk Arrays; 8th International Symposium on Stabilization, Safety and Security of Distributed Systems; Nov. 2006.
Robert Morelos-Zaragoza; The Error Correcting Codes (ECC) Page; http://www.eccpage.com/; Aug. 2008.
Wikipedia; Forward Error Correction; http://en.wikipedia.org/wiki/Forward_error_correction; Taken from site Aug. 10, 2010.
Wikipedia; Erasure Code; http://en.wikipedia.org/wiki/Erasure_Code; Taken from site Aug. 10, 2010.
Wolfram MathWorld; Error-Correcting Code; http://mathworld.wolfram.com/Error-CorrectingCode.html; Taken from site Aug. 10, 2010.

* cited by examiner

*Primary Examiner* — Joshua P Lottich
(74) *Attorney, Agent, or Firm* — Advantedge Law Group

(57) ABSTRACT

A computer-implemented method for improving redundant storage fault tolerance may include 1) identifying a plurality of storage devices storing an encoded set of data, with the encoded set of data including a redundant form of an underlying set of data, 2) determining that a subset of the plurality of storage devices have failed, 3) reconstructing encoded data lost due to the failure of the subset of the plurality of storage devices, and then 4) redundantly storing the reconstructed encoded data on the plurality of storage devices. Various other methods, systems, and computer-readable media are also disclosed.

18 Claims, 6 Drawing Sheets

SYSTEMS AND METHODS FOR IMPROVING REDUNDANT STORAGE FAULT TOLERANCE

BACKGROUND

In the digital age, organizations increasingly rely on digitally stored data. To protect against data loss, an organization may use a redundant storage system to store important data. Redundant storage systems may store more information than is necessary to recover the underlying data, such that even if some information is lost (e.g., from damage to a storage device) the storage system may still fully recover the underlying data.

For example, a redundant storage system may apply an erasure code to data to be stored on the system, creating a number ("n") of data points to represent the data. Of the n data points, a certain number ("k") may suffice to retrieve the original data from the storage system. By storing each of the n data points on an independent storage unit, n-k such storage units may fail without any loss of the original data.

In order to allow for more storage unit failures, the redundant storage system may apply an erasure code with a larger n. Unfortunately, this may also entail provisioning the redundant storage system with a larger number of storage units, which may be costly. Additionally, some redundant storage systems may require tamper-proofing, which may preclude the possibility of replacing any failed storage units with new storage units. Therefore, a designer or administrator using traditional technologies may need to over-provision the redundant storage system with storage units to ensure that the redundant storage system does not exceed its fault tolerance over its lifetime (e.g., an archival storage system may be provisioned with 100 disks to allow for 20 failures over 10 years). The instant disclosure accordingly identifies a need for improving redundant storage fault tolerance.

SUMMARY

As will be described in greater detail below, the instant disclosure generally relates to systems and methods for improving redundant storage fault tolerance. In one example, the systems described herein may accomplish such a task by 1) identifying a plurality of storage devices (e.g., within an archival storage system, a distributed storage system, etc.) storing an encoded set of data, where the encoded set of data includes a redundant form of an underlying set of data, 2) determining that a subset of the plurality of storage devices have failed, 3) reconstructing encoded data lost due to the failure of the subset of the plurality of storage devices, and then 4) redundantly storing the reconstructed encoded data on the plurality of storage devices.

In some examples, the systems disclosed herein may reconstruct the encoded data by 1) decoding a corresponding portion of the underlying set of data using portions of the encoded set of data that survived the failure and then 2) re-encoding the corresponding portion of the underlying set of data. Additionally or alternatively, these systems may reconstruct the encoded data by generating the lost encoded data without fully decoding and re-encoding a corresponding portion of the underlying data set.

Upon reconstructing the encoded data, the systems described herein may redundantly store the same by, for example, storing the reconstructed encoded data in a stripe across the plurality of storage devices. In some examples, this may entail encoding the reconstructed encoded data to create the stripe. For example, the systems described herein may identify a level of fault tolerance for the reconstructed encoded data and then encode the reconstructed encoded data to match the level of fault tolerance. In some examples, the level of fault tolerance may include a level of fault tolerance that applies to the underlying set of data.

The systems described herein may also store metadata relating to the redundantly stored reconstructed encoded data on the plurality of storage devices, such as 1) a location of the redundantly stored reconstructed encoded data on the plurality of storage devices, 2) decoding information for the redundantly stored reconstructed encoded data, and/or 3) information indicating that the redundantly stored reconstructed encoded data corresponds with the encoded data lost due to the failure. In some examples, the systems described herein may redundantly store the metadata with a higher level of fault tolerance than the redundantly stored reconstructed encoded data.

As will be explained in detail below, the systems and methods described herein may dynamically maintain the fault tolerance of redundant storage systems without replacing failed storage devices, thereby potentially allowing a tamper-proof redundant storage system to use fewer storage devices without increasing the chances of data loss.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
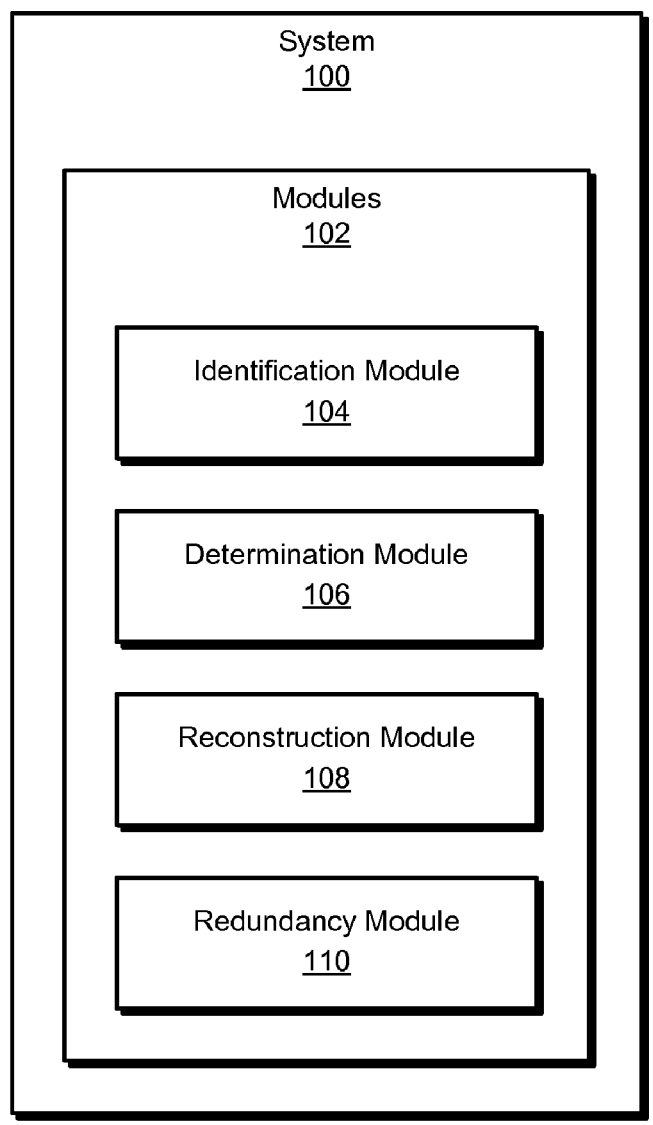
FIG. 1 is a block diagram of an exemplary system for improving redundant storage fault tolerance.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
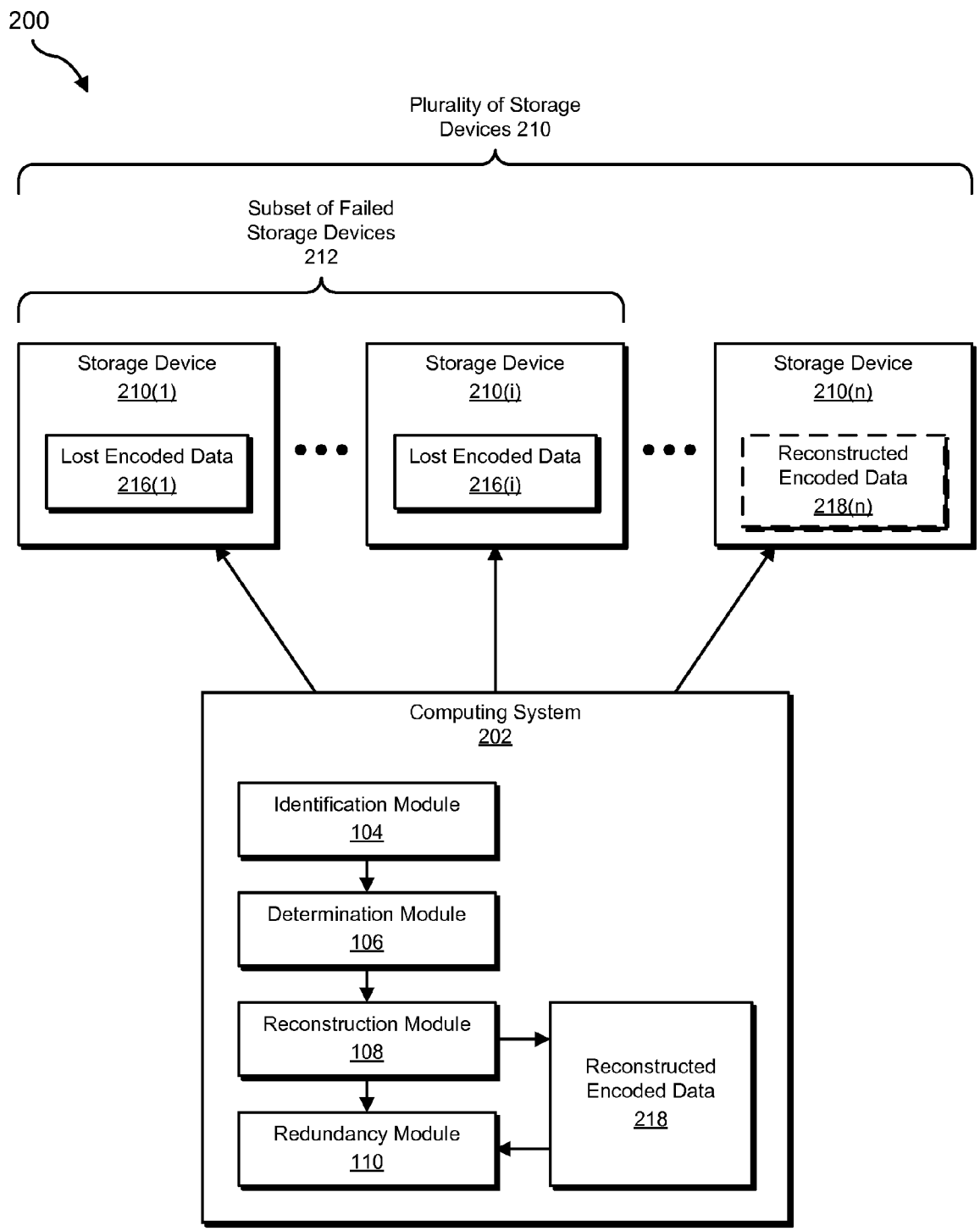
FIG. 2 is a block diagram of an exemplary system for improving redundant storage fault tolerance.
Figure 3:
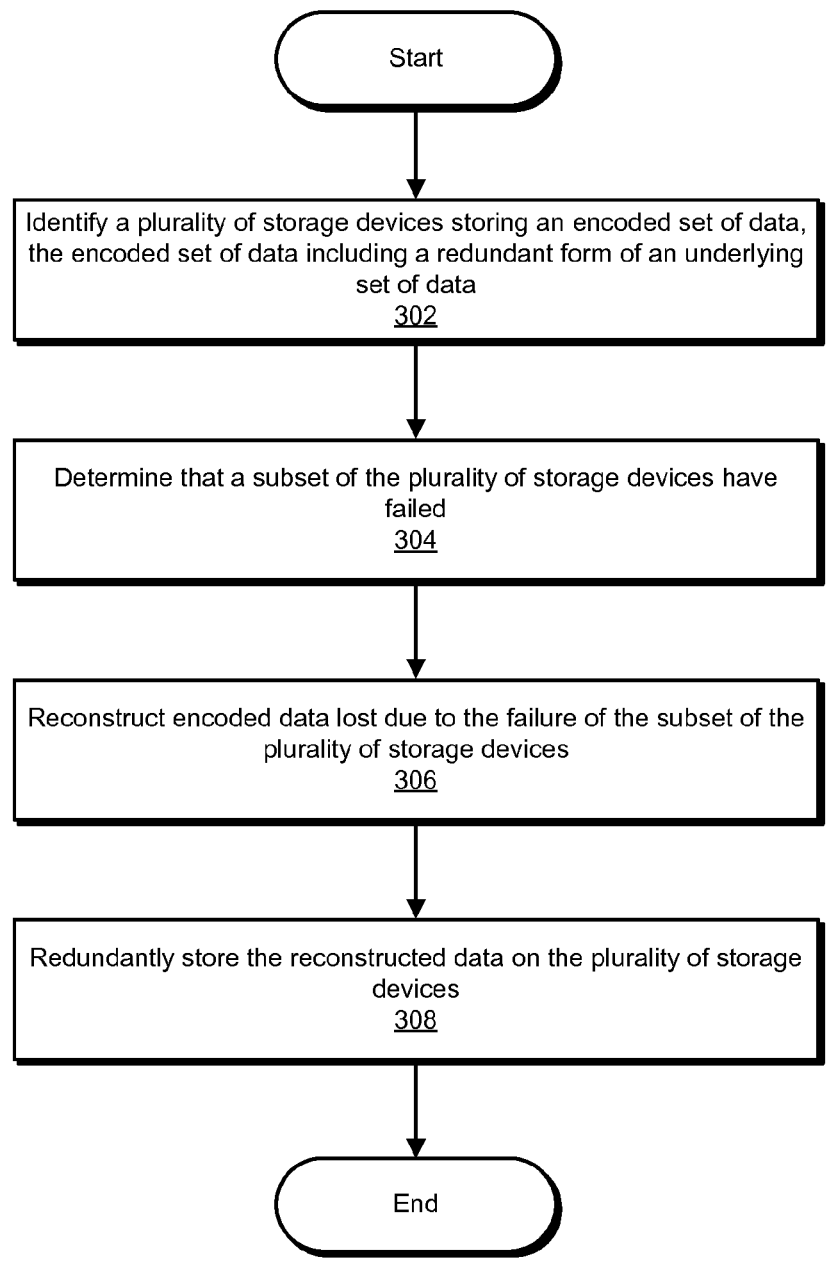
FIG. 3 is a flow diagram of an exemplary method for improving redundant storage fault tolerance.
Figure 4:
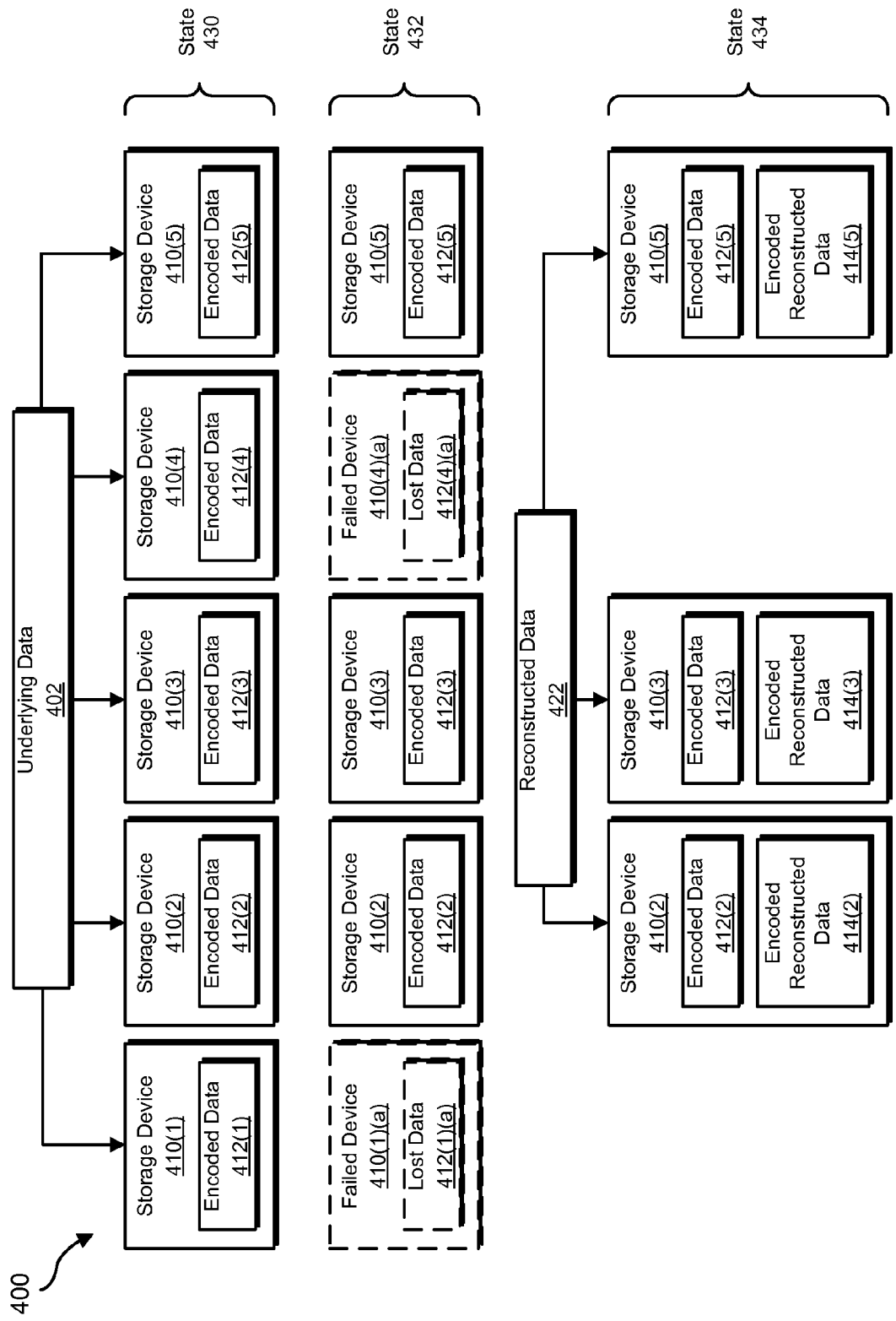
FIG. 4 is a block diagram of an exemplary system for improving redundant storage fault tolerance.

The following will provide, with reference to FIGS. 1, 2, and 4, detailed descriptions of exemplary systems for improving redundant storage fault tolerance. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for improving redundant storage fault tolerance. As illustrated in this figure, exemplary system 100 may include one or more modules 102 for performing one or more tasks. For example, and as will be explained in greater detail below, exemplary system 100 may include an identification module 104 programmed to identify a plurality of storage devices storing an encoded set of data, where the encoded set of data includes a redundant form of an underlying set of data. Exemplary system 100 may also include a determination module 106 programmed to determine that a subset of the plurality of storage devices have failed.

In addition, and as will be described in greater detail below, exemplary system 100 may include a reconstruction module 108 programmed to reconstruct encoded data lost due to the failure of the subset of the plurality of storage devices. Exemplary system may also include a redundancy module 110 programmed to redundantly store the reconstructed encoded data on the plurality of storage devices. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 202 illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 in communication with a plurality of storage devices 210. In one embodiment, and as will be described in greater detail below, computing system 202 may include modules 102 from FIG. 1 (e.g., identification module 104, determination module 106, reconstruction module 108, and redundancy module 110).

In one example, and as will be described in greater detail below, modules 102 may program computing system 202 to 1) identify a plurality of storage devices storing an encoded set of data (e.g., storage devices 210), where the encoded set of data includes a redundant form of an underlying set of data, 2) determine that a subset of the plurality of storage devices have failed (e.g., a subset of failed storage devices 212), 3) reconstruct encoded data lost (e.g., lost encoded data 216(1)-(i)) due to the failure of the subset of the plurality of storage devices, and then 4) redundantly store the reconstructed encoded data (e.g., reconstructed encoded data 218) on the plurality of storage devices (e.g., in encoded portions, such as reconstructed encoded data 218(n)).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Storage devices 210(1)-(n) generally represent any type or form of storage device or medium capable of storing data. For example, storage devices 210(1)-(n) may include a magnetic disk drive (e.g., a so-called hard drive), a floppy disk drive, a magnetic tape drive, an optical disk drive, a flash drive, or the like.

Computing system 202 may communicate with storage devices 210 in any suitable manner. For example, computing system 202 may include one or more embedded systems connected to, integrated with, and/or in communication with storage devices 210. Additionally or alternatively, computing system 202 may communicate with storage devices 210 across a network and/or any medium or architecture capable of facilitating communication or data transfer. Examples of such a network include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Such a network may facilitate communication or data transfer using wireless or wired connections.

FIG. 3 is a flow diagram of an exemplary computer-implemented method 300 for improving redundant storage fault tolerance. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a plurality of storage devices storing an encoded set of data that includes a redundant form of an underlying set of data. For example, at step 302 identification module 104 may, as part of computing system 202 in FIG. 2, identify storage devices 210. As an additional example, FIG. 4 illustrates an exemplary system 400. In this example, identification module 104 may identify storage devices 410(1)-(5) storing encoded data 412(1)-(5) that may include a redundant form of underlying data 402.

As used herein, the term "storage device" may refer to any device and/or medium capable of storing data. Generally, a "storage device" may refer to any unit of storage having an independent failure mode (e.g., wherein a failure may be separately detected and/or remediated).

In addition, the term "redundant" as applied to data and/or the storage thereof may refer to a scheme whereby original data (e.g., the "underlying set of data") may be encoded and/or stored such that some of the encoded and/or stored data may be lost without loss of the original data. For example, the encoded set of data may include a transformation of the underlying set of data with an (n, k) erasure code. The term "erasure code," as used herein, may refer to any erasure-correction code and/or error-correction code, including but not limited to Reed-Solomon, Golay, and/or a Chinese Remainder Theorem based code. In this example, the underlying set of data (or a segment thereof) may be encoded into n pieces (or "strips") a(1)-a(n), such that any k strips are sufficient to reconstruct the original data. As will be described in greater detail below, these n strips may together comprise a "stripe."

The plurality of storage devices may operate in a variety of contexts. For example, the plurality of storage devices may include at least a portion of an archival storage system. In this example, the underlying set of data may include archived data which is to be maintained for a certain time period (e.g., 20 years). In another example, the plurality of storage devices may include at least a portion of a distributed storage system. In this example, one or more of the storage devices may reside at differing geographical locations (e.g., and therefore may not be readily accessible as a group).

Identification module 104 may perform step 302 in any suitable manner. For example, identification module 104 may identify the plurality of storage devices by reading a configuration file identifying the plurality of storage devices. Additionally or alternatively, identification module 104 may identify the plurality of storage devices by receiving a message identifying the plurality of storage devices (e.g., a message indicating a failure of one or more of the storage devices).

Returning to FIG. 3, at step 304 one or more of the systems described herein may determine that a subset of the plurality of storage devices have failed. For example, at step 304 determination module 106 may, as part of computing system 202 in FIG. 2, determine that subset of failed storage devices 212 have failed. Using FIG. 4 as an additional example, determination module 106 may determine that storage devices 410(1) and 410(4) in state 430 have failed (represented as failed devices 410(1)(a) and 410(4)(a) in state 432).

As used herein, the term "failure," as applied to a storage device, may refer to any status and/or condition in which the storage device may not reliably produce data stored on it. Examples of such failures include, but are not limited to, storage access failures, communication failures, physical damage, corrupted data, etc.

Determination module 106 may perform step 304 in any suitable manner. For example, determination module 106 may receive a message (e.g., from a storage device in the plurality of storage devices and/or a system managing the storage device) indicating that a subset of the plurality of storage devices have failed. In some examples, determination module 106 may identify each failed storage device as it fails. Additionally or alternatively, determination module 106 may identify failed storage devices in the subset as a group. For example, determination module 106 may receive a message when a predetermined number of storage devices within the plurality have failed. Specifically, the plurality of storage devices may store data encoded with a (100, 80) erasure code scheme and determination module 106 may accordingly receive a message when 20 storage devices out of 100 have failed.

Returning to FIG. 3, at step 306 one or more of the systems described herein may reconstruct encoded data lost to the failure of the subset of the plurality of storage devices. For example, at step 306 reconstruction module 108 may, as part of computing system 202 in FIG. 2, reconstruct lost encoded data 216, resulting in reconstructed encoded data 218. Using FIG. 4 as an additional example, reconstruction module 108 may reconstruct lost data 412(1)(a) and 412(4)(a), resulting in reconstructed data 422.

Reconstruction module 108 may reconstruct the lost encoded data in a variety of ways. For example, reconstruction module 108 may first decode a corresponding portion of the underlying set of data using portions of the encoded set of data that survived the failure. For example, as mentioned earlier, the encoded set of data may have been encoded with an (n, k) erasure code by, e.g., dividing the underlying set of data into pieces and encoding each piece into n strips that may have been stored across the plurality of storage devices as a stripe. In this example, reconstruction module 108 may, for each stripe, read k strips from the k surviving storage devices of the stripe. As k strips are sufficient in an (n, k) erasure code to decode the stripe, reconstruction module 108 may accordingly decode each stripe back into the piece of data from the underlying set of data which originated it.

Upon decoding the corresponding portion (e.g., each piece corresponding to a stripe with lost strips on the failed storage devices), reconstruction module 108 may re-encode the corresponding portion of the underlying data set to recreate the lost strips from the failed storage devices (e.g., by applying the same erasure code as before to each piece).

In another example, reconstruction module 108 may reconstruct the lost encoded data by generating the lost encoded data without fully decoding and re-encoding a corresponding portion of the underlying set of data. For example, an erasure code based on the Chinese Remainder Theorem ("CRT") may allow generating strips more efficiently than fully decoding and fully recoding. For example, a CRT-based (n, k) erasure code may encode a piece of data using a set of n pairwise coprimes—one for each strip in a stripe—and calculating the modulo of an integer form of the piece of data for each pairwise coprime, with each calculation resulting in a strip. Decoding an entire stripe encoded in this manner may require performing a modulo M operation, where M is the product of the set of pairwise coprimes. However, performing a modulo $m(i)$ on the same value—where $m(i)$ is a pairwise coprime corresponding to a strip of the stripe—may generate the strip.

Returning to FIG. 3, at step 308 one or more of the systems described herein may redundantly store the reconstructed data on the plurality of storage devices. For example, at step 308 redundancy module 110 may, as part of computing system 202 in FIG. 2, redundantly store reconstructed encoded data 218 on storage devices 210. Using FIG. 4 as an additional example, redundancy module 110 may redundantly store reconstructed data 422 on storage devices 410(2), 410(3), and 410(5) as encoded reconstructed data 414(2), 414(3), and 414(5).

Redundancy module 110 may redundantly store the reconstructed encoded data in a variety of ways. In some examples, redundancy module 110 may store the reconstructed encoded data in a stripe across the plurality of storage devices. Redundancy module 110 may create the stripe across surviving storage devices.

In some examples, the reconstructed encoded data may itself be encoded with an erasure code. For example, redundancy module 110 may identify a level of fault tolerance for the reconstructed encoded data and then encode the reconstructed encoded data to match the level of fault tolerance. For example, the original erasure code scheme used for redundantly storing the underlying set of data may be (100, 80). After the failure of 10 disks, the encoded data of the 10 disks may be reconstructed and encoded with a (90, k') erasure code scheme and then stored on the plurality of storage devices (e.g., as a stripe).

Redundancy module 110 may identify the level of fault tolerance in a variety of ways. For example, redundancy module 110 may read from a configuration file that identifies the level of fault tolerance. Additionally or alternatively, redundancy module 110 may calculate a level of fault tolerance based a one or more relevant factors, such as the lifetime left for an archival storage system using the plurality of storage devices, anticipated storage space requirements, etc. In one example, redundancy module 110 may use a level of fault tolerance equivalent and/or related to a level of fault tolerance used for the underlying set of data. For example, using the earlier example of an original erasure code scheme of (100, 80) and a 10-disk failure, redundancy module may choose k' to be 70 for an erasure code scheme of (90, 70) for the encoding of the reconstructed encoded data. This may allow 20 additional disk failures.

In some examples, redundancy module 110 may also store metadata relating to the redundantly stored reconstructed encoded data on the plurality of storage devices. The metadata may include a variety of information. For example, the metadata may identify where the redundantly stored reconstructed encoded data is stored on the plurality of storage devices. Additionally or alternatively, the metadata may identify decoding information for the redundantly stored reconstructed encoded data. For example, the metadata may identify the erasure code scheme used to redundantly store the reconstructed encoded data (e.g., so that the reconstructed encoded data can be correctly decoded when it, in turn, is needed for decoding a stripe). The metadata also may identify information indicating that the redundantly stored reconstructed encoded data corresponds with the encoded data lost due to the failure (e.g., so that the correct portion reconstructed encoded data can be found when it is needed for decoding a stripe).

Redundancy module 110 may store the metadata on the plurality of storage devices in a variety of ways. For example, redundancy module 110 may redundantly store the metadata on the plurality of storage devices. In some examples, redundancy module 110 may redundantly store the metadata on the plurality of storage devices using a higher level of fault tolerance than the redundantly stored reconstructed encoded data. In one example, redundancy module 110 may store a complete copy of the metadata on each storage device in the plurality of storage devices. In other examples, redundancy module 110 may use a more conservative erasure code scheme (e.g., referencing the earlier example of 100 storage devices, redundancy module 110 may use a (100, 70) or (100, 50) erasure code scheme). Upon completion of step 310, method 300 may terminate.

In some examples, the systems and methods above may be applied recursively. For example, an underlying set of data may originally be redundantly stored using an (n, k) erasure code. After f storage devices fail, the systems described herein may reconstruct the encoded data lost on the f storage devices and encode the reconstructed data using an (n−f, k') erasure code. After f' additional failures, the systems described herein may reconstruct the encoded data lost on the f' storage devices—comprising both originally encoded data from the underlying set of data and reconstructed data lost during the first failures—and encode the second group of reconstructed data using an (n−f−f', k") erasure code. This process may continue until there is not sufficient space left on the plurality of storage devices.

As detailed above, the systems and methods described herein may dynamically maintain the fault tolerance of redundant storage systems without replacing failed storage devices, thereby potentially allowing a tamper-proof redundant storage system to use fewer storage devices without increasing the chances of data loss.

Figure 5:
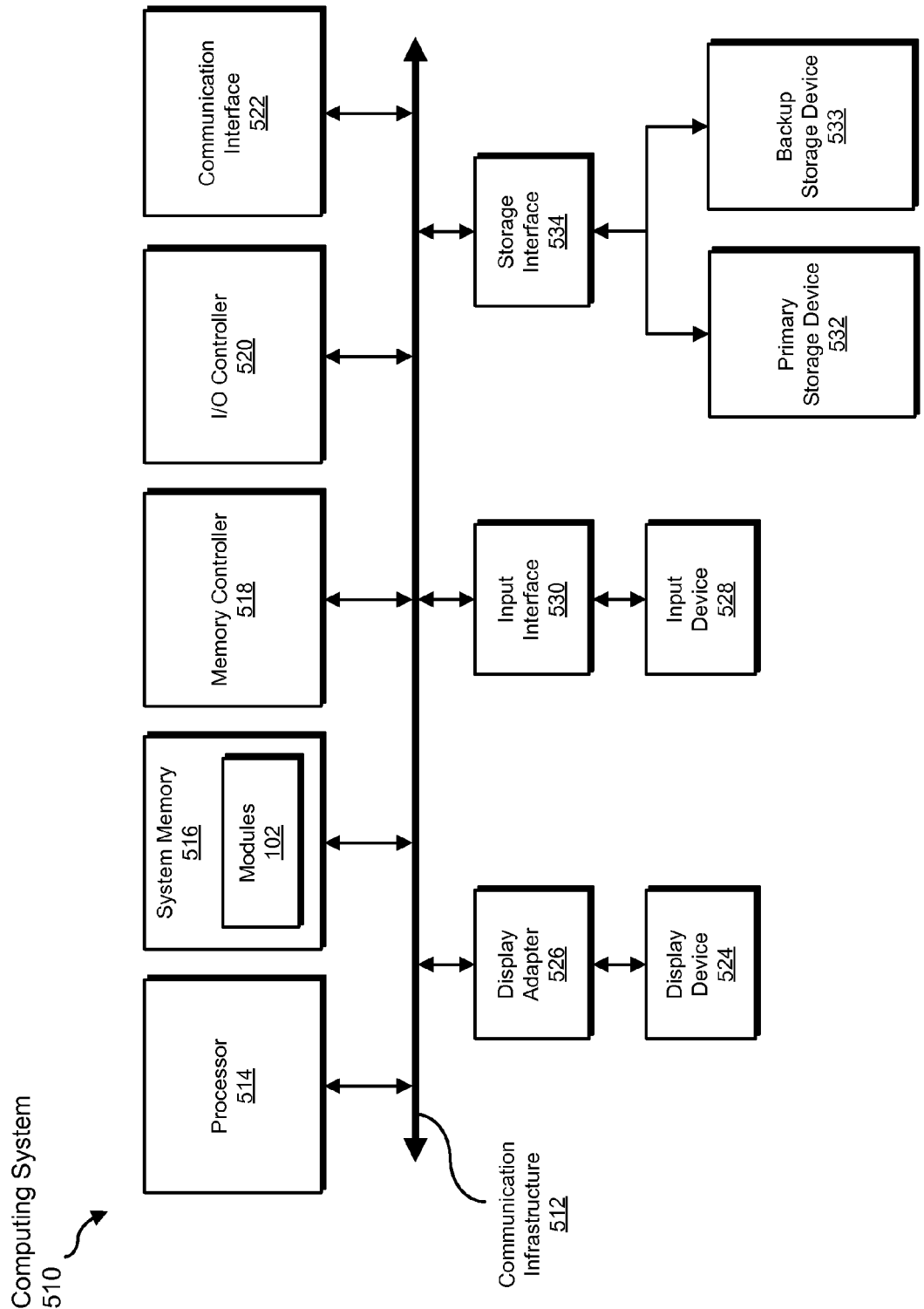
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, determining, reconstructing, decoding, re-encoding, generating, storing, and/or encoding steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, determining, reconstructing, decoding, re-encoding, generating, storing, and/or encoding.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, determining, reconstructing, decoding, re-encoding, generating, storing, and/or encoding steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, determining, reconstructing, decoding, re-encoding, generating, storing, and/or encoding steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, determining, reconstructing, decoding, re-encoding, generating, storing, and/or encoding steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, determining, reconstructing, decoding, re-encoding, generating, storing, and/or encoding steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
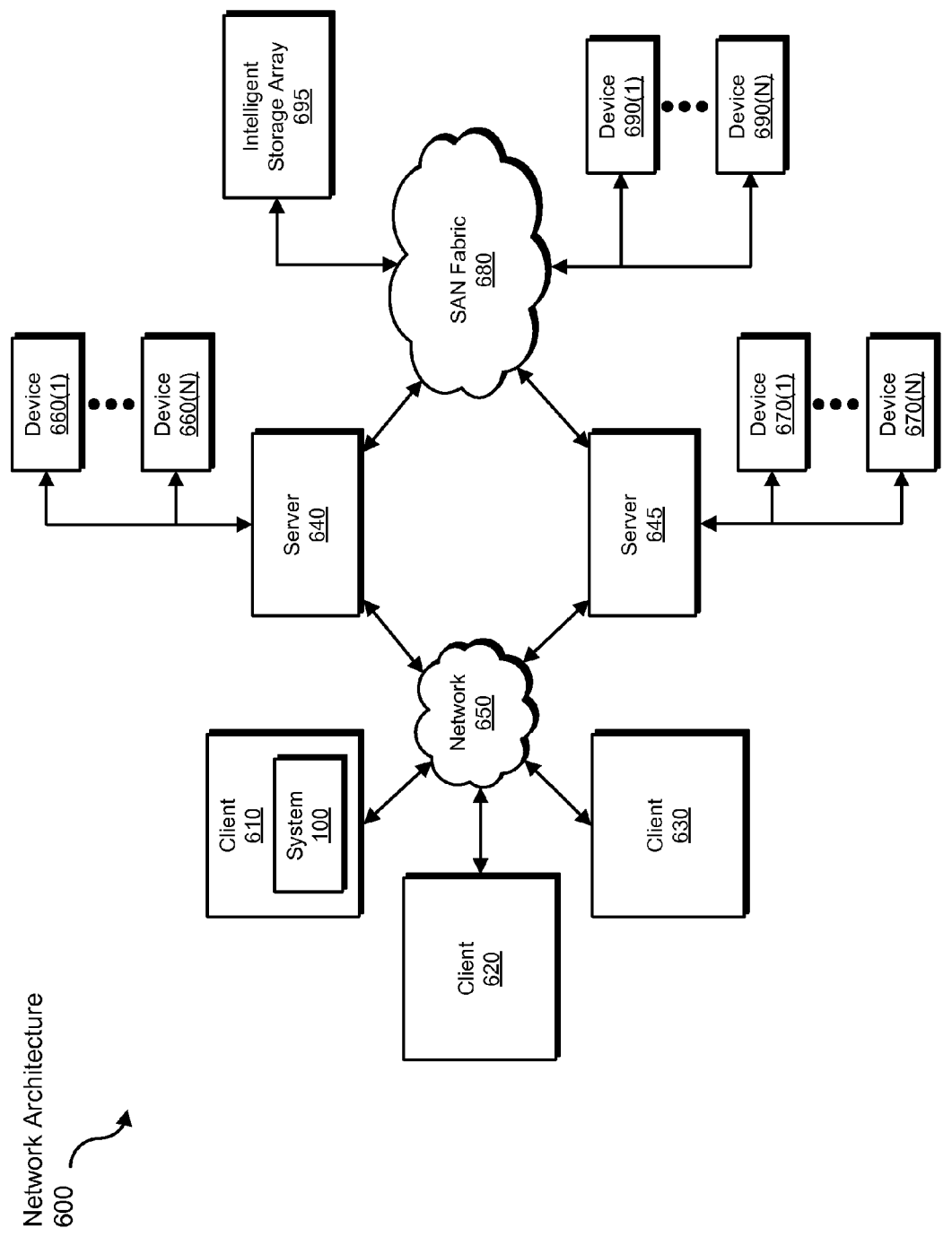
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, determining, reconstructing, decoding, re-encoding, generating, storing, and/or encoding steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for improving redundant storage fault tolerance.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The systems described herein may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform an archival storage system into an archival storage system with improved fault tolerance.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for improving redundant storage fault tolerance, at least a portion of the method being performed by a computing device comprising at least one processor, the method comprising:
    identifying a plurality of storage devices storing an encoded set of data, the encoded set of data comprising a redundant form of an underlying set of data;
    determining that a subset of the plurality of storage devices have failed;
    reconstructing encoded data lost due to the failure of the subset of the plurality of storage devices;
    redundantly storing the reconstructed encoded data on the plurality of storage devices by:
        identifying a level of fault tolerance for the reconstructed encoded data;
        encoding the reconstructed encoded data to match the level of fault tolerance.

2. The computer-implemented method of claim 1, wherein the plurality of storage devices comprises at least one of:
    at least a portion of an archival storage system;
    at least a portion of a distributed storage system.

3. The computer-implemented method of claim 1, wherein reconstructing the encoded data comprises:
    decoding a corresponding portion of the underlying set of data using portions of the encoded set of data that survived the failure;
    re-encoding the corresponding portion of the underlying set of data.

4. The computer-implemented method of claim 1, wherein reconstructing the encoded data comprises generating the lost encoded data without fully decoding and re-encoding a corresponding portion of the underlying set of data.

5. The computer-implemented method of claim 1, wherein redundantly storing the reconstructed encoded data on the plurality of storage devices comprises storing the reconstructed encoded data in a stripe across the plurality of storage devices.

6. The computer-implemented method of claim 1, wherein the level of fault tolerance for the reconstructed encoded data comprises a level of fault tolerance for the underlying set of data.

7. The computer-implemented method of claim 1, wherein redundantly storing the reconstructed encoded data on the plurality of storage devices comprises storing metadata relating to the redundantly stored reconstructed encoded data on the plurality of storage devices.

8. The computer-implemented method of claim 7, wherein the metadata comprises at least one of:
    a location of the redundantly stored reconstructed encoded data on the plurality of storage devices;
    decoding information for the redundantly stored reconstructed encoded data;
    information indicating that the redundantly stored reconstructed encoded data corresponds with the encoded data lost due to the failure.

9. The computer-implemented method of claim 7, wherein storing the metadata on the plurality of storage devices comprises redundantly storing the metadata on the plurality of storage devices with a higher level of fault tolerance than the redundantly stored reconstructed encoded data.

10. A system for improving redundant storage fault tolerance, the system comprising:
    an identification module programmed to identify a plurality of storage devices storing an encoded set of data, the encoded set of data comprising a redundant form of an underlying set of data;
    a determination module programmed to determine that a subset of the plurality of storage devices have failed;
    a reconstruction module programmed to reconstruct encoded data lost due to the failure of the subset of the plurality of storage devices;
    a redundancy module programmed to redundantly store the reconstructed encoded data on the plurality of storage devices by:
        identifying a level of fault tolerance for the reconstructed encoded data;
        encoding the reconstructed encoded data to match the level of fault tolerance;
    at least one processor configured to execute the identification module, the determination module, the reconstruction module, and the redundancy module.

11. The system of claim 10, wherein the plurality of storage devices comprises at least one of:
    at least a portion of an archival storage system;
    at least a portion of a distributed storage system.

12. The system of claim 10, wherein the reconstruction module is programmed to reconstruct the encoded data by:
    decoding a corresponding portion of the underlying set of data using portions of the encoded set of data that survived the failure;
    re-encoding the corresponding portion of the underlying set of data.

13. The system of claim 10, wherein the reconstruction module is programmed to reconstruct the encoded data by generating the lost encoded data without fully decoding and re-encoding a corresponding portion of the underlying set of data.

14. The system of claim 10, wherein the redundancy module is programmed to redundantly store the reconstructed encoded data on the plurality of storage devices by storing the reconstructed encoded data in a stripe across the plurality of storage devices.

15. The system of claim 10, wherein the level of fault tolerance for the reconstructed encoded data comprises a level of fault tolerance for the underlying set of data.

16. The system of claim 10, wherein the redundancy module is programmed to redundantly store the reconstructed encoded data on the plurality of storage devices by storing metadata relating to the redundantly stored reconstructed encoded data on the plurality of storage devices.

17. The system of claim 16, wherein the metadata comprises at least one of:

- a location of the redundantly stored reconstructed encoded data on the plurality of storage devices;
- decoding information for the redundantly stored reconstructed encoded data;
- information indicating that the redundantly stored reconstructed encoded data corresponds with the encoded data lost due to the failure.

18. A non-transitory computer-readable-storage medium comprising one or more computer-executable instructions that, when executed by at least one processor of a computing device, cause the computing device to:

- identify a plurality of storage devices storing an encoded set of data, the encoded set of data comprising a redundant form of an underlying set of data;
- determine that a subset of the plurality of storage devices have failed;
- reconstruct encoded data lost due to the failure of the subset of the plurality of storage devices;
- redundantly store the reconstructed encoded data on the plurality of storage devices by:
  - identifying a level of fault tolerance for the reconstructed encoded data;
  - encoding the reconstructed encoded data to match the level of fault tolerance.

* * * * *

UNITED STATES PATENT AND TRADEMARK OFFICE
CERTIFICATE OF CORRECTION

PATENT NO. : 8,386,841 B1
APPLICATION NO. : 12/840772
DATED : February 26, 2013
INVENTOR(S) : Dilip Ranade Page 1 of 1

It is certified that error appears in the above-identified patent and that said Letters Patent is hereby corrected as shown below:

Title Page

Item (12) should read:

Ranade

Item (75) should read:

Inventor: Dilip Ranade, Maharashtra (IN)

Signed and Sealed this
Twenty-fifth Day of June, 2013

Teresa Stanek Rea
*Acting Director of the United States Patent and Trademark Office*